(12) United States Patent
Ooi et al.

(10) Patent No.: US 11,750,027 B2
(45) Date of Patent: Sep. 5, 2023

(54) OMNIDIRECTIONAL DATA AND ENERGY HARVESTING SYSTEM AND METHOD IN UNDERWATER WIRELESS OPTICAL COMMUNICATION

(71) Applicant: KING ABDULLAH UNIVERSITY OF SCIENCE AND TECHNOLOGY, Thuwal (SA)

(72) Inventors: Boon Siew Ooi, Thuwal (SA); Tien Khee Ng, Thuwal (SA); Chun Hong Kang, Thuwal (SA); Meiwei Kong, Thuwal (SA); Yujian Guo, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 23 days.

(21) Appl. No.: 17/715,335

(22) Filed: Apr. 7, 2022

(65) Prior Publication Data
US 2022/0329103 A1    Oct. 13, 2022

Related U.S. Application Data

(60) Provisional application No. 63/173,152, filed on Apr. 9, 2021.

(51) Int. Cl.
*H02J 50/00* (2016.01)
*H04B 10/40* (2013.01)
(Continued)

(52) U.S. Cl.
CPC ............ *H02J 50/001* (2020.01); *F03B 13/10* (2013.01); *H02J 50/30* (2016.02); *H04B 10/40* (2013.01); *H04B 13/02* (2013.01)

(58) Field of Classification Search
None
See application file for complete search history.

(56) References Cited

U.S. PATENT DOCUMENTS 9,749,044 B1    8/2017  Tiecke et al.
10,009,119 B1 *  6/2018  Hiller ................. H02S 40/22
(Continued)

FOREIGN PATENT DOCUMENTS

WO    2020170166 A1    8/2020
WO    2021229434 A1    11/2021

OTHER PUBLICATIONS

Guo, Y., et al., "Compact Scintillating-Fiber/450-nm-Laser Transceiver for Full-Duplex Underwater Wireless Optical Communication System Under Turbulence," Optics Express, Dec. 20, 2021, vol. 30, No. 1, pp. 53-60, Optica Publishing Group.
(Continued)

*Primary Examiner* — Jared Fureman
*Assistant Examiner* — Joel Barnett
(74) *Attorney, Agent, or Firm* — PATENT PORTFOLIO BUILDERS PLLC

(57) ABSTRACT

A free node to be deployed underwater for omnidirectional energy and data harvesting includes a housing that forms a sealed chamber; a wavelength-changing layer attached to an outside of the housing and configured to receive a first optical signal having a first wavelength range and to emit a second optical signal having a second wavelength range, different from the first wavelength range, wherein the first optical signal includes encoded data; a flexible solar cell wrapped around the housing, the flexible solar cell being configured to receive the second optical signal and generate an electrical signal; an energy storage module located in the chamber and configured to store electrical energy associated with the electrical signal; and a decoder located in the chamber and configured to receive the electrical signal and
(Continued)

decode the encoded data. The first wavelength range is ultraviolet light and the second wavelength range is visible or infrared light.

20 Claims, 13 Drawing Sheets

(51) Int. Cl.
*H04B 13/02* (2006.01)
*H02J 50/30* (2016.01)
*F03B 13/10* (2006.01)

(56) References Cited

U.S. PATENT DOCUMENTS

2018/0136364 A1* 5/2018 Kare ................. H02J 50/10
2022/0365581 A1* 11/2022 Mizukami ............ G06F 1/3206

OTHER PUBLICATIONS

Kang, C.H., et al., "Ultraviolet-to-Blue Color-Converting Scintillating-Fibers Photoreceiver for 375-nm Laser-Based Underwater Wireless Optical Communication," Optics Express, Oct. 8, 2019, vol. 27, No. 21, pp. 30450-30461, Optical Society of America.

* cited by examiner

| Moving Speed (m/s) | Motor Speed (r/min) | Data Rate (Mbit/s) | Averaged Scintillation Index | Outage Duration (Fiber/Benchmark system) (ms) | Outage Probability (Fiber/Benchmark system) (%) |
|---|---|---|---|---|---|
| 0.86 | 500 | 250 | 0.0221 | 1.6/40 | 4/100 |
| 1.72 | 1000 | 250 | 0.0407 | 2.8/40 | 7/100 |
| 2.06 | 1200 | 250 | 0.0419 | 5.6/40 | 14/100 |

FIG. 10

OMNIDIRECTIONAL DATA AND ENERGY HARVESTING SYSTEM AND METHOD IN UNDERWATER WIRELESS OPTICAL COMMUNICATION

CROSS-REFERENCE TO RELATED APPLICATIONS

This application claims priority to U.S. Provisional Patent Application No. 63/173,152, filed on Apr. 9, 2021, entitled "OMNIDIRECTIONAL DATA AND ENERGY HARVESTING IN UNDERWATER WIRELESS OPTICAL COMMUNICATION," the disclosure of which is incorporated herein by reference in its entirety.

BACKGROUND

Technical Field

Embodiments of the subject matter disclosed herein generally relate to a system and method for omnidirectional energy harvesting and data communications in an underwater medium, and more specifically, implementing wireless optical communication in a self-powered node in underwater optical networks.

Discussion of the Background

The marine economy has become a vital part of the world and an essential carrier for economic growth owing to the limitations of terrestrial resources. The demand on remote underwater observation, ocean sensing technologies, and underwater wireless communication (UWC) are growing as humanity enters the marine era. Establishing real-time, large-scale, and low-cost underwater sensor networks can boost remote underwater observation technologies. The Internet of Underwater Things (IoUT) has been proposed to interconnect underwater sensors, ships, underwater vehicles, and relays. Thus, it required to have an efficient mechanism for data exchange between various underwater vehicles and sensors for oceanic seismic monitoring, seafloor survey, pollution control, etc. In the last decade, UWC has moved from sonar technology to more advanced underwater wireless optical communication (UWOC) technology, which employs light as a signal carrier in the UWC link. UWOC offers wide bandwidth, high transmission speed, and low latency characteristics; thus, it is superior to underwater acoustic and radiofrequency (RF) communication.

However, complex underwater channel conditions hinder the development of UWOC. The working distance of a UWOC system is limited by the attenuation, which is the sum effects of absorption, scattering, and various underwater turbulence. Absorption and scattering effects depend on the frequency of light and water properties, such as salinity and particle suspension. Underwater turbulence affects the optical beam propagation path by changing the refractive index (RI) of water due to the random variations in the presence of air bubbles, temperature, salinity, etc. The turbulence results in beam distortion and thus degrades the performance of the UWOC system. Hence, a UWOC system has strict requirements for positioning, aligning, and tracking (PAT) to maintain steady performance and increase its robustness.

The above noted problems affect the communication side of these nodes. However, as these nodes are usually distributed on the ocean bottom or floating in water at large depths, another issue affecting them is the required continuous power supply. For example, the current underwater sensor nodes do not have a self-charging function and must be retrieved when their battery is discharged. If not retrieved, the collected data may be lost and sometimes, the entire node is lost as its location beacon stops transmitting its position. Thus, the communication and energy harvesting functions, which enable the sensor nodes to transfer the data back to a server without physically retrieving the node are desired for underwater sensor networks (USNs).

One solution to the above problems is the use of solar cells. Solar cells that simultaneously serve as energy provider and as the data receiver of the UWOC system is appealing because of its dual functions of data acquisition and energy harvesting. Solar cell detectors can support massive data traffic for the distributed objects of the IoUT. Solar cells with the dual functions of energy harvesting and data acquisition have been proven to be appealing alternatives to commonly used detectors (e.g., PIN diodes and avalanche photodiodes) to resolve energy issues. Most work on solar cells-based OWC focused on improving data rates and transmission distances. Considerable effort is still required to support high-availability, high-reliability, and cost-effective heterogeneous data traffic in 5G networks and beyond.

However, energy issues are the main challenges for underwater monitoring applications. Offering electrical energy to support devices working in underwater scenarios is challenging either by cabling or by battery. Self-powered devices or robotics could solve the working distance limit or operation duration limit. For example, an energy harvesting system on an autonomous underwater vehicle (AUV) could support long-term deployment of sensor nodes and reduce the reliance on shore connected charging station. However, the cost of running the AUV is high and requires specialized operators.

In addition to the above noted problems, when deploying the UWOC system using underwater vehicles, the marine organisms could firmly adhere to the vehicle's propellers and structures made of copper alloy as they are fully immersed in seawater for long periods of time. The adhesion of marine organisms increases the power consumption of the vehicle, contributes to the corrosion of the structures, and degrades the energy harvesting and underwater communication performances.

More recent solutions have been tried to solve all the above problems. For example, [1] discloses the use of ultraviolet-to-blue scintillating fibers coupled with an avalanche photodetector for optical signal detection in underwater wireless optical communication. However, this solution did not resolve the issue of limited access to wireless power supply in deep-underwater environment as the avalanche photodetector still requires a relatively high operating voltage (larger than 12V) and thus, this system is not an energy-autonomous system. The solution proposed by [2] uses a wavelength-shifting element for detecting an optical signal in a free-space environment, but not in the underwater environment, for example, for an underwater sensor node or underwater wireless optical communication. Further, the wavelength-shifting element in this reference is not used for simultaneous signal detection and energy harvesting.

The present authors proposed in [3] the use of silicon-based solar cells for simultaneous energy harvesting and weak signal detection in underwater wireless optical communication. However, the system in [3] requires a good alignment between the receiver and transmitter when exchanging data, which is not an easy task to accomplish for underwater moving nodes. Further, the authors of this invention proposed in [4] a large-area, waveguided-based optical detection system. However, this work does not address the energy issue faced by the underwater nodes.

Thus, there is a need for a new system that is capable of exchanging data and harvesting energy while deployed underwater, with minimum human intervention and at a low cost.

BRIEF SUMMARY OF THE INVENTION

According to an embodiment, there is a free node that is configured to be deployed underwater for omnidirectional energy and data harvesting. The free node includes a housing that forms a sealed chamber, a wavelength-changing layer attached to an outside of the housing and configured to receive a first optical signal having a first wavelength range and to emit a second optical signal having a second wavelength range, different from the first wavelength range, wherein the first optical signal includes encoded data, a flexible solar cell wrapped around the housing, the flexible solar cell being configured to receive the second optical signal and generate an electrical signal, an energy storage module located in the chamber and configured to store electrical energy associated with the electrical signal, and a decoder located in the chamber and configured to receive the electrical signal and decode the encoded data. The first wavelength range is ultraviolet light and the second wavelength range is visible or infrared light.

According to another embodiment, there is a free node to be deployed underwater for omnidirectional energy and data harvesting. The free node includes a housing that forms a sealed chamber, one or more wavelength-converting scintillating fibers attached to an outside the housing and configured to receive a first optical signal having a first wavelength range and to emit a second optical signal having a second wavelength range, different from the first wavelength range, wherein the first optical signal includes encoded data, an energy storage module located in the chamber, a flexible solar cell located within the chamber, the flexible solar cell being configured to receive the second optical signal and generate a first electrical signal for charging the energy storage module, a photodetector located within the chamber and configured to transform the second optical signal into a second electrical signal, and an optical coupler configured to supply the second optical signal either to the flexible solar cell or to the photodetector. The first wavelength range is ultraviolet light and the second wavelength range is visible or infrared light.

According to still another embodiment, there is a method for optical wireless underwater communication, and the method includes receiving a first optical signal, having a first wavelength range, at a wavelength-changing element that is wrapped around a housing that forms a sealed chamber, wherein the first optical signal includes encoded data, generating, with the wavelength-changing element, a second optical signal having a second wavelength range, different from the first wavelength range, coupling, with an optical coupler, the second wavelength signal to a flexible solar cell, the flexible solar cell being configured to transform the second optical signal into a first electrical signal, charging an energy storage module, located in the chamber, with the first electrical signal, coupling, with the optical coupler, the second wavelength signal to a photodetector, the photodetector being configured to transform the second optical signal into a second electrical signal, and decoding, with a decoder, the second electrical signal to extract the data. The first wavelength range is ultraviolet light and the second wavelength range is visible or infrared light.

BRIEF DESCRIPTION OF THE DRAWINGS

For a more complete understanding of the present invention, reference is now made to the following descriptions taken in conjunction with the accompanying drawings, in which:

FIG. 10 illustrates testing results for the moving free nodes underwater while in optical communication with each other.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to an underwater node that collects data regarding a certain characteristic of the environment. However, the embodiments to be discussed next are not limited to such a node, but may be applied to communication nodes that have the only purpose of transmitting data and not collecting data about the environment.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 2:
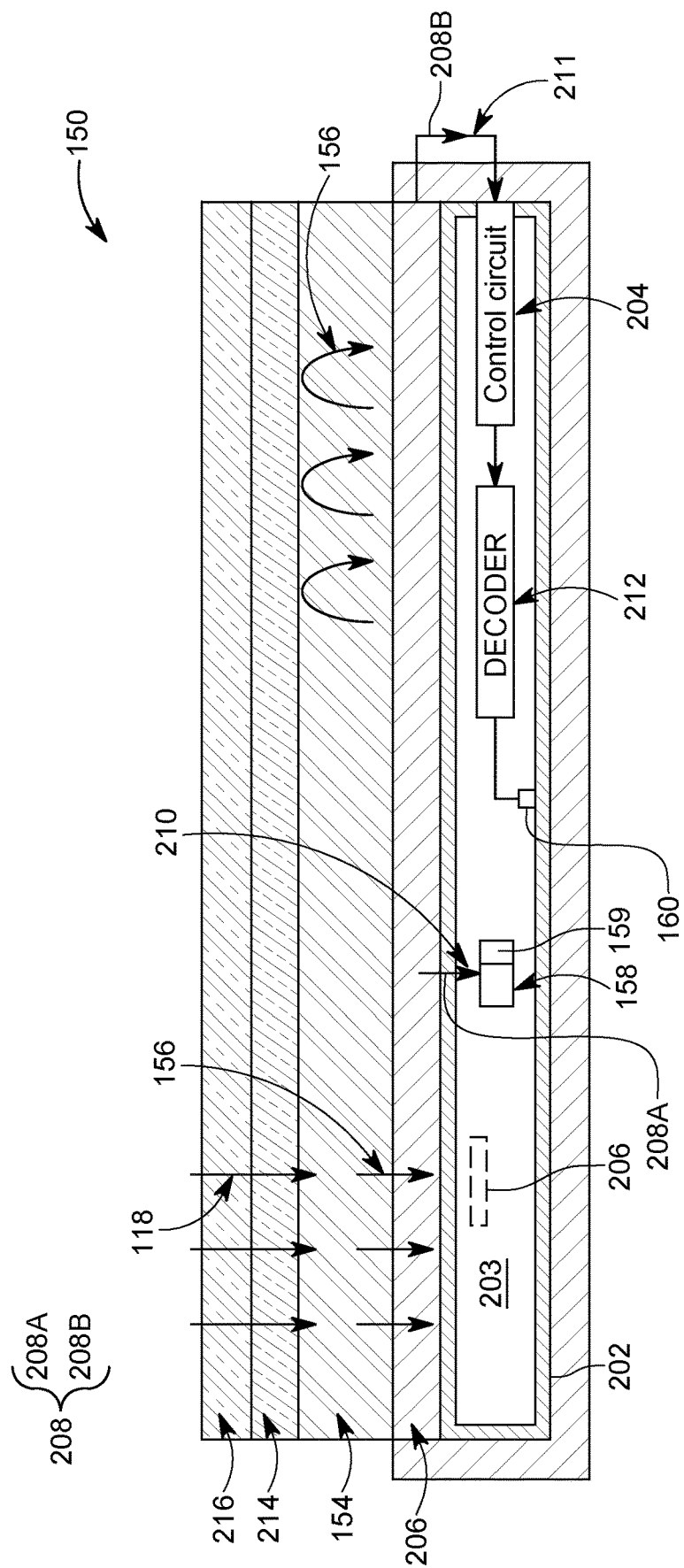
FIG. 2 is a schematic diagram of a free node that is capable of omnidirectional data and energy harvesting underwater.
Figure 3:
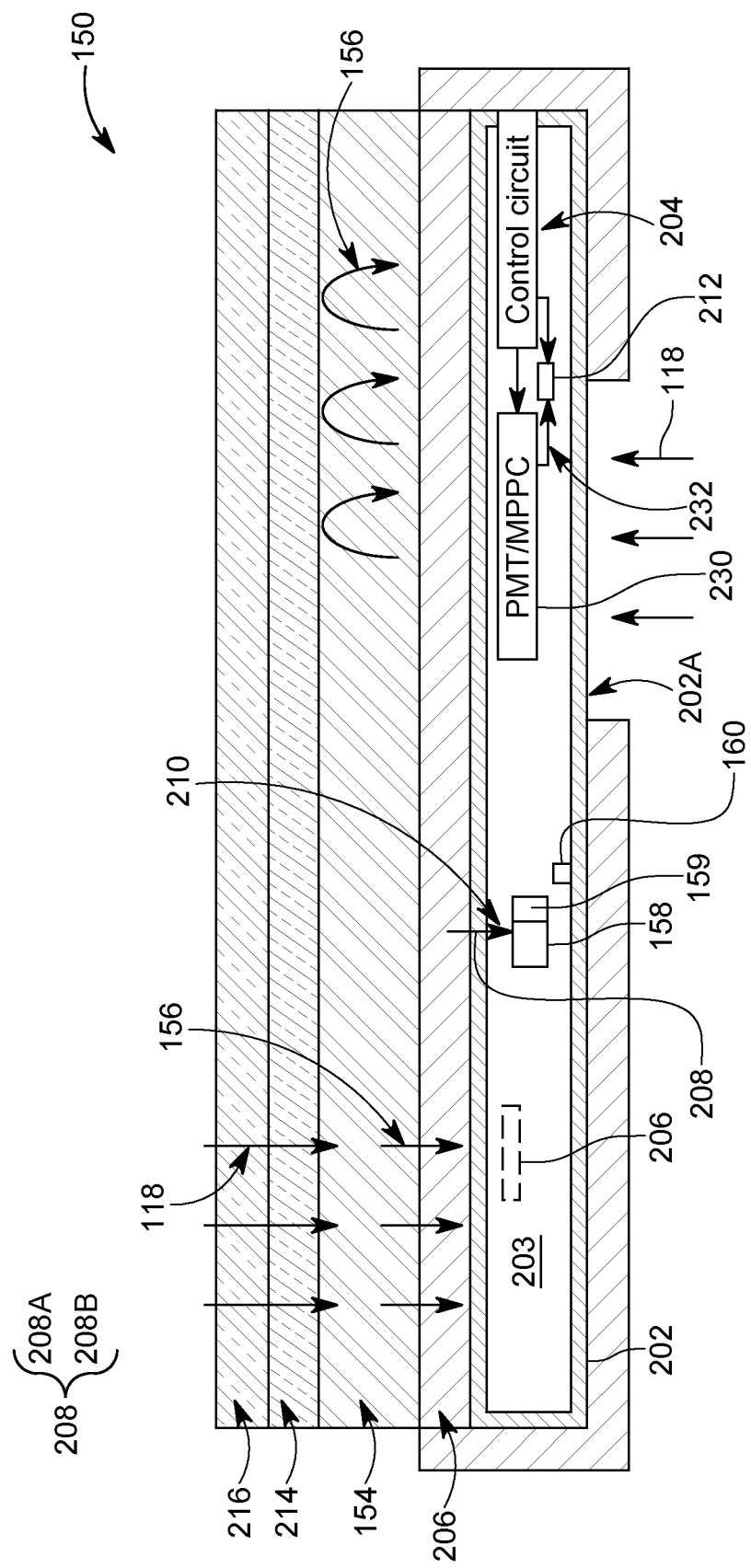
FIG. 3 is a schematic diagram of another free node that is capable of omnidirectional data and energy harvesting underwater.
Figure 5:
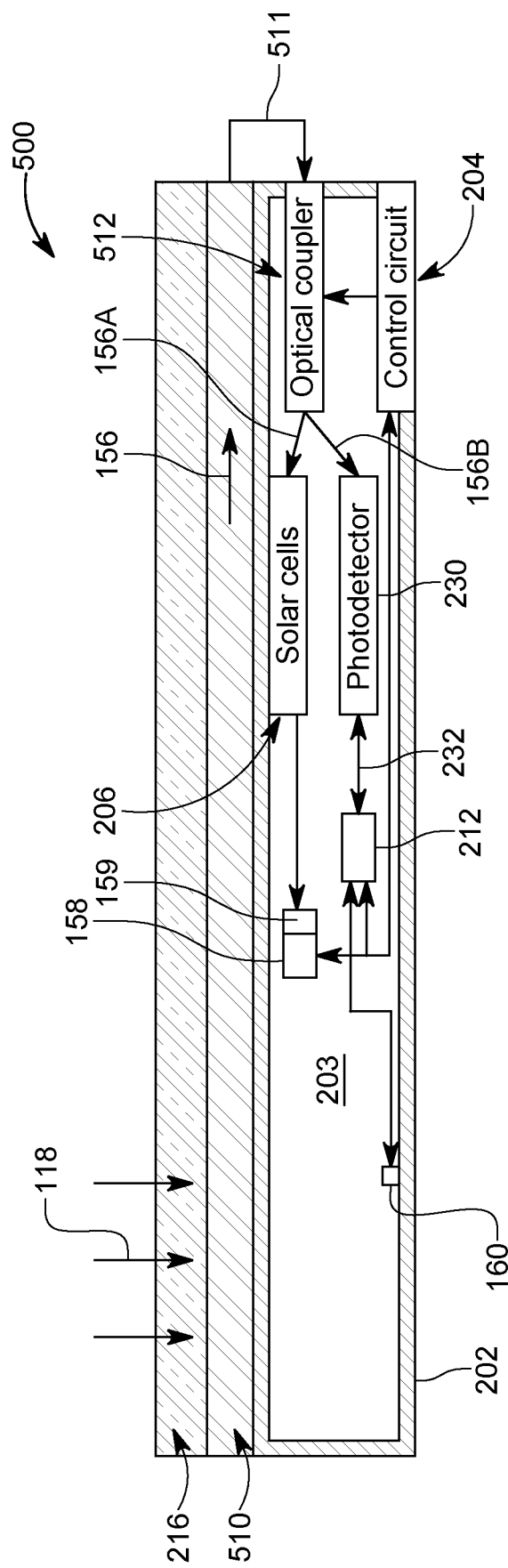
FIG. 5 is a schematic diagram of yet another free node that is capable of omnidirectional data and energy harvesting underwater.

According to an embodiment, a wavelength-shifting element (e.g., a layer of material as shown in FIGS. 2 and 3 or one or more fibers as shown in FIG. 5) is provided around or in the marine node for converting an incoming first signal having a first wavelength, into a second signal having a second wavelength, different from the first wavelength. The node is configured for extracting (1) energy from the second signal for powering up its electronics and also (2) the encoded data for communication purposes. The wavelength-shifting element may be a wavelength-conversion layer that absorbs the first signal and emits the second signal, or a wavelength-scintillating layer, which in addition to converting the wavelength, acts as a waveguided element. No matter which implementation is selected, the wavelength-shifting element does not face link alignment with the source of the first signal for underwater wireless optical communication as the wavelength-shifting element is omnidirectional. Thus, the PAT issues faced by the existing nodes is overcome. In one application, the node is also provided with an anti-biofouling coating to prevent the adhesion of microorganisms to the node. As the above node is capable of omnidirectional communication and energy harvesting, it can be deployed as interconnected wireless-energy-autonomous sensing-nodes with optical communication capabilities.

Figure 1:
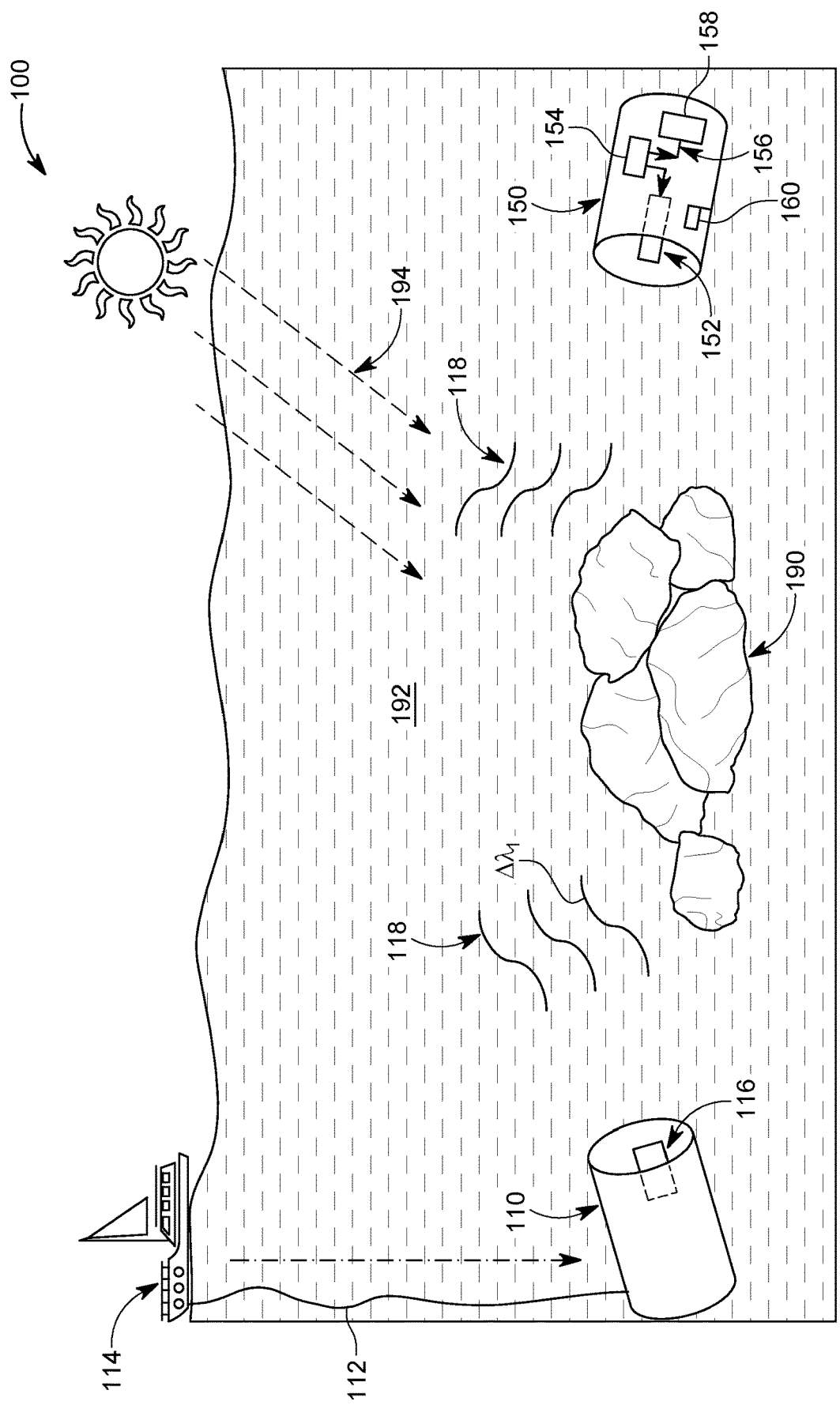
FIG. 1 is a schematic diagram of an optical communication system that is deployed underwater and does not need alignment between the transmitter and the receiver.

An omnidirectional data and energy harvesting node, called herein simply the node, is now discussed with regard to the figures. FIG. 1 shows an underwater communication system 100 that includes a cable-connected node 110 and an autonomous, independent, free node 150. Note that the free node 150 is not attached to any cable or device, but is free to move if strong underwater currents are present. In other words, no cables or wires connect the node to the environment or other structures external to the node. The cable-connected node 110 is connected through a cable 112 to a mother ship 114 and this cable ensures that power and data is exchanged between the mother ship and the cable-connected node. The cable-connected node 110 includes a transceiver 116 that is configured to emit a first optical signal 118, having a first wavelength range $\Delta\lambda_1$.

The free node 150 also includes a transceiver 152, that includes the wavelength-changing element as the receiver and a laser diode as the transmitter. In this embodiment, the wavelength-changing element is implemented as a wavelength-changing layer 154, which is configured to receive the first optical signal 118, change its first wavelength range $\Delta\lambda_1$ to a second wavelength range $\Delta\lambda_2$, and then emit a second optical signal 156, having the second wavelength range $\Delta\lambda_2$. In one embodiment, the second optical signal 156 is supplied to a decoder (discussed later with regard to FIG. 2) for extracting the stored data, and may also be supplied to electronics 158 for harvesting electrical energy from the signal. FIG. 1 shows that obstacles 190 may be present in the water 192, which prevents a direct line contact between the two nodes 110 and 150. For this purpose (i.e., to make the free node to be omnidirectional in terms of receiving the first optical signal 118), the first optical signal 118 is selected to have the first wavelength range $\Delta\lambda_1$ in the UV range (e.g., 100 to 400 nm) so that the signal scatters around the obstacle 190 to arrive at the free node 150 from many directions, i.e., in an omnidirectional manner. In this regard, note that the UV light has a high scattering coefficient in water as compared to the visible wavelength region (about 400 to 800 nm). The figure also shows the natural light 194 from the sun entering into the water 192, but because of the depth of the free node 150, e.g., over 200 m, this light is almost entirely attenuated.

The free node 150 may include one or more sensors 160, which are distributed inside or outside the housing of the node. In one embodiment, some sensors are distributed inside while other nodes may be distributed outside. For example, if the free node is a seismic node, i.e., used to collect seismic data associated with surveying the subsurface for determining oil and/or gas reserves, the sensor 160 may include a hydrophone, i.e., a sensor which measure the water pressure, and/or an accelerometer, i.e., a sensor which measure water movement. Other seismic sensors like geophone, seismometer, gravity sensors may be used. In another embodiment, the free node 150 may be a node that collects ocean data. For this case, the sensor 160 may include a pH sensor, temperature sensor, pressure sensor, turbidity sensor, or even an organic particulate detection sensor. Those skilled in the field would understand that the free node may be practically used in any underwater network, no matter the purpose of the network. For example, the free node 150 may be used exclusively for communication purposes, with no sensor 160.

FIG. 2 schematically illustrates one possible configuration of the free node 150 and some of the internal/external components of the node. The free node 150 has a housing 202 that seals inside the electronics 158 and a control circuit 204, within a sealed chamber 203. The housing may be made of any material that withstands sea water, for example, polymer, glass, quartz, metal, steel, etc. In this embodiment, the outside wall of the housing 202 is fully covered with one or more flexible solar cells 206. The flexible solar cell 206 surrounding the housing 202 could be made up of any Si-based solar cells known to the art, e.g., amorphous-silicon solar cell (a-Si). In fact, any flexible solar cell may be used in this embodiment. The solar cell used needs to be flexible in order to follow the surface profile of the housing 202 to fully wrap it. In this regard, the housing 202 may be shaped to be like a box, cylindrical, spherical, or any other appropriate shape.

In one application, the flexible solar cell may be attached with a glue or adhesive to the external wall of the housing so that no part of the housing is exposed to the ambient. The silicon-based solar cells exhibit a low absorption coefficient in the ultraviolet-based region, which make them less desirable for energy harvesting in the ultraviolet region. Thus, in this embodiment, a wavelength-changing layer 154 is placed around the flexible solar cell 206, so that the first optical signal 118 is changed to the second optical signal 156 so that the light received by the flexible solar cell 206 is not UV light. In one application, the wavelength-changing layer 154 is selected to change the incoming UV light (100 to 400 nm) into visible light (400 to 780 nm) and/or infrared, IR, light (800 nm to about 1 mm). Thus, in this embodiment, the first optical signal is in the UV range and the second optical signal is in the visible and/or IR range. This means that visible and/or IR light directly impinges on the flexible solar cell 206, which considerable boosts its energy harvesting efficiency. Although FIG. 2 shows the wavelength-changing layer 154 partially encasing the flexible solar cell 206, in one embodiment it is possible to have the solar cells 206 fully encapsulated by the wavelength-changing layer 154. The wavelength-changing layer 154 may be made of any polymer or inorganic/organic-inorganic metal halide perovskite that could absorb ultraviolet-based photons and re-emit light at another longer wavelength, in the visible or near-infrared region.

The second optical signal 156 is transformed by the flexible solar cell 206 into an electrical signal 208. In one implementation, a part 208A of the electrical signal is directed to the electronics 158, via a first path 210, where it is stored as electrical energy. This means that the electronics 158 includes an energy storage device 159 (for example, a battery) and other controlling electronics for storing the energy from the electrical signal 208A. Another part 208B of the electrical signal 208 is routed to the control circuits 204, through a different path 211. The partial signal 208B is then provided to a decoder 212 to extract the information encoded in the signal. In this regard, note that the first optical signal 118 was originally encoded at the node 110 with data and that information is preserved in the electrical signal 208. Thus, with this configuration, the free node 150 may simultaneously harvest energy from the electrical signal 208A and extract information from the electrical signal 208B.

This embodiment may be modified to send the entire electrical signal 208 to the electronics 158, when the energy stored in the battery 159 is determined by the control circuit 204 to be low, or to send the entire electrical signal 208 to the decoder 212 for data extraction, when the control circuit 204 determines that the battery 159 is charged more than a given threshold. For example, when the free node 150 is not used to receive or transmit data, the entire electrical signal 208 may be used for energy harvesting. In this implementation, the control circuit 204 decides which mode to use, i.e., data extraction or energy harvesting. When the electrical signal 208 is split into first and second parts 208A and 208, the energy harvesting, and data decoding may happen simultaneously. In one application, one solar cell or array is used to generate the first part 208A and another solar cell or array is used to generate the second part 208B.

In one application, the wavelength-changing element 154 may be coated with an anti-reflection layer 214, for example, a distributed Bragg reflector (DBR) or other known material for achieving photon-recycling and to ensure a high conversion efficiency. In addition or instead, an anti-biofouling layer 216 may be added, either directly onto the wavelength-changing element 154 or directly onto the anti-reflection layer 214 for preventing marine organisms/animals to attach to the free node 150. The anti-biofouling layer needs to have a high transparency to the UV light, for example, between 60 and 100%, and any known material may be used for this layer. The layers 214 and 216 may be formed to fully or partially enclose the wavelength-changing element 154.

Figure 4:
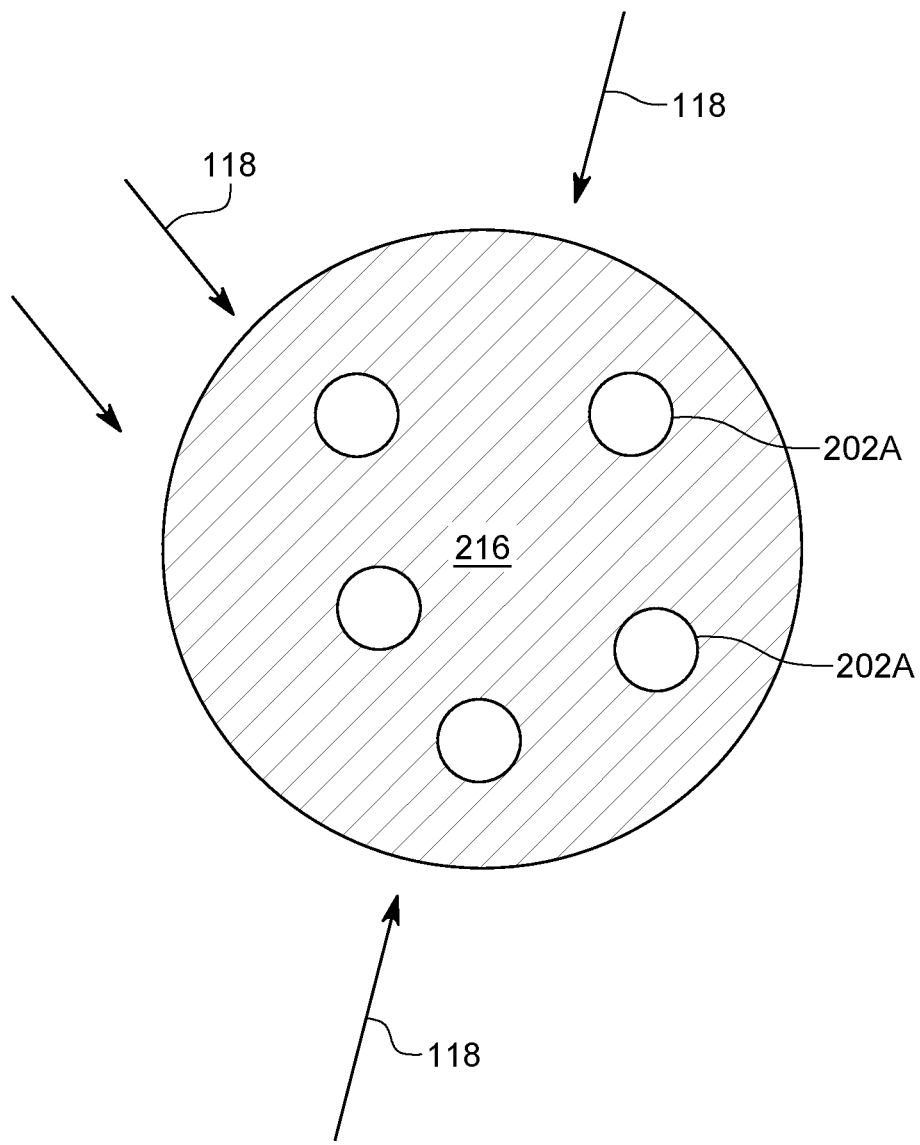
FIG. 4 illustrates the deposition of an anti-fouling layer over the free node.

In a variation of the embodiment illustrated in FIG. 2, it is possible, as now illustrated in FIG. 3, to not fully enclose the housing 202 with the flexible solar cell 206, but to leave at least a portion 202A of the housing free of any additional layer so that the first optical signal 118 can directly reach the housing and enter inside the chamber 203. For this embodiment, the electrical signal 208 is only used to charge the battery 159, but not to decode the data from the incoming first optical signal 118. The first optical signal 118 enters through the wall of the housing 202 and directly reaches an ultraviolet-based photodetection module 230, which transforms the first optical signal 118 into an electrical signal 232. This electrical signal is now provided to the decoder 212 for extracting the encoded information. The ultraviolet-based photodetection module 230 may include a photomultiplier tube (PMT) and/or multi-pixel photo counters (MPPC) that are configured to work in a non-line-of-sight ambient. Other electronics may be present to support the optical to electrical conversion of the signals. Although FIG. 3 shows a small portion of the housing being directly exposed to the incoming first optical signal 118, it is possible that the portion 202A accounts for 50% or more of the total outside area of the housing. It is also possible that the portion 202A is distributed around the housing, as shown in FIG. 4, to promote the omnidirectional capability in receiving the incoming first optical signal 118.

For both the embodiments illustrated in FIGS. 2 and 3, it is possible to place the flexible solar cell 206 inside the chamber 203, as illustrates in these figures by the dash line. If the flexible solar cell 206 is located inside the housing 202, then the walls of the housing need to be transparent to the second optical signal 156 as this optical signal needs to enter inside the housing. Thus, for this variation of the embodiments of FIGS. 2 and 3, the housing may be made of quartz so that the visible and/or IR second optical signal 156 can reach the flexible solar cell 206. For these variations of the embodiments of FIGS. 2 and 3, the entire solar cells are placed inside the chamber 203 and the wavelength-changing element 154 is formed directly on the external surface of the housing 202.

In a different embodiment, as illustrated in FIG. 5, the free node 500 has the wavelength-changing element implemented as one or more wavelength-converting scintillating fibers 510, and these fibers are placed outside the housing 202. In a different embodiment, the fibers may be placed inside the housing. In one application, the fiber 510 is placed in direct contact with an external wall of the housing 202. In another application, the fiber 510 may be floating by itself in the water and is optically connected to the housing along an optical conduit 511. Optionally, the fiber 510 may be coated with the anti-biofouling layer 216. The fiber 510 may have any length, may be placed in strands along a longitudinal direction of the housing, or may be wrapped around the housing. In one application, the entire housing is covered with the fiber(s) 510. In yet another application, the fibers 510 may be manufactured to be a wavelength-converting scintillating sheet, and this sheet is used to fully or partially wrap the housing 202.

The incoming first optical signal 118 impinges on the fiber 510 and the fiber is configured, as discussed later, to transform the first optical signal into the second optical signal 156. The second optical signal 156 is formed within the core of the fiber and it is guided by the fiber 510 to an optical coupler 512, which is controlled by the control circuit 204. The optical coupler 512 is configured to split or couple a first part 156A of the second optical signal to the solar cells 206, and a second part 156B of the second optical signal to a photodetector 230. In one embodiment, the optical coupler 512 couples the entire second optical signal 156 to either the solar cell 206 or to the photodetector 230, as decided by the control circuit 204. Both the solar cell 206 and the photodetector 230 are provided inside the chamber 203. The solar cell 206 transforms the received second optical signal 156A part into electrical energy, which is then stored in the energy storage device (e.g., battery 159) of the electronics 158. The photodetector 230 transforms the received second optical signal 156B part into an electrical signal 232, which is provided to the decoder 212 for extracting the information encoded into the original first optical signal 118. The energy storage device 159 of the electronics 158 is connected to the control circuit 204 and/or the decoder 212 for providing the necessary energy. The control circuit 204 may be configured to switch the outgoing photons from the optical coupler 512 into either the solar cell 206 for powering up other sensors, devices, or systems, to the photodetector module 230 for data communication. The optical coupler 230 can include, but is not limited to, micro-electro-mechanical systems (MEMS) micromirror, digital micromirror devices (DMDs), or any apparatus known in the art for switching the incoming optical beam between the solar cells 206 and the photodetector module 230.

As previously discussed, a sensor 160 for measuring a characteristic of the environment may be placed outside or inside the chamber 203. The sensor 160 is electrically connected to the decoder 212 and/or to the control circuit 204 for transmitting the measured characteristic to the node 110. This aspect is discussed later. However, for these situations, the decoder 212 may be programmed to also act as an encoder.

Figure 6:
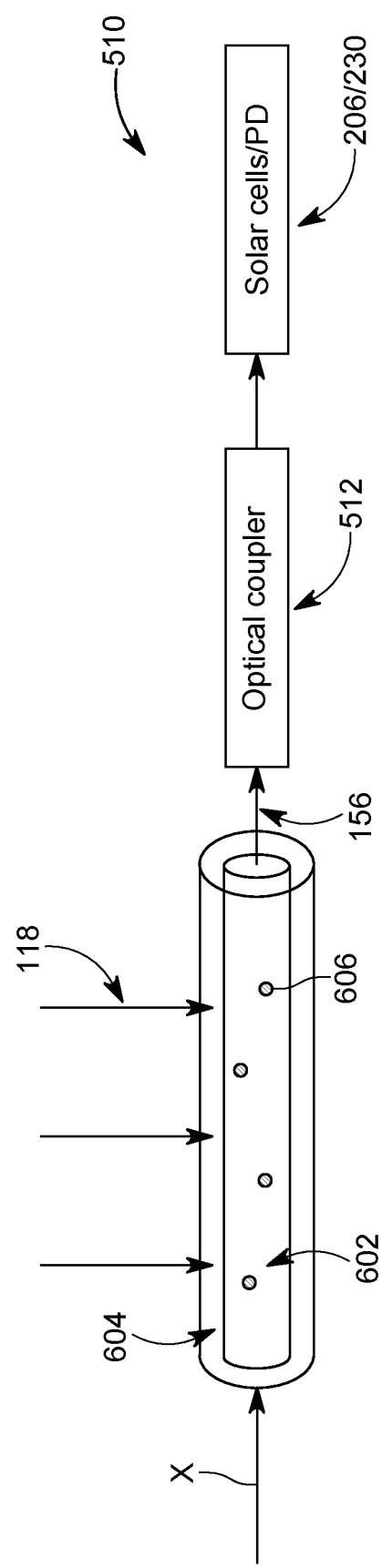
FIG. 6 illustrates a wavelength-converting scintillating fiber used by the free node for changing a wavelength of an emitted signal.

The wavelength-converting scintillating fiber 510 converts the incoming photons 118 in the ultraviolet-based region into photons 156 having any wavelengths in the visible or near-infrared region. The wavelength-converting scintillating fiber 510 is shown in FIG. 6 in more detail, and it has a core 602 and a cladding layer 604. The core 602 may be made of materials that include, but are not limited to, any polymer or inorganic/organic-inorganic metal halide perovskite that could absorb ultraviolet-based photons and re-emit at another longer wavelength, in the visible or near-infrared region, as well as of higher refractive index than the cladding layer 604. The cladding layer 604 could be made of ultraviolet-transparent polymer known in the art, including but not limited to aliphatic polymers, prefluoropolymer, or Butvar B-98. In one application, the core 602 includes particles 606 that have the property of changing the first optical signal into the second optical signal and the remaining portion of the core may be made of traditional materials used for optical fibers.

More specifically, the scintillating fibers 510 are known to form a large photodetection area of up to 30 cm×1.2 cm (length×width) [1]. In the scintillating fiber, the incoming light ($\lambda 1$) is absorbed by the dye molecules 606 (organic or inorganic) doped in the core layer 602 (see FIG. 6) and Stoke-shifted into a longer wavelength ($\lambda 2$), i.e., $\lambda 2 > \lambda 1$. The core structure may have in one implementation a refractive index (n1) of 1.60 and the cladding layer may have a refractive index (n2) of 1.49. Due to the difference in the refractive index of the core (n1) and the cladding layer (n2), i.e., n1>n2, the wavelength-shifted light signal 156 propagates along the longitudinal axis X of the core 602 to both ends of the fiber 510, i.e., it is confined to within the core 602.

Figure 7A:
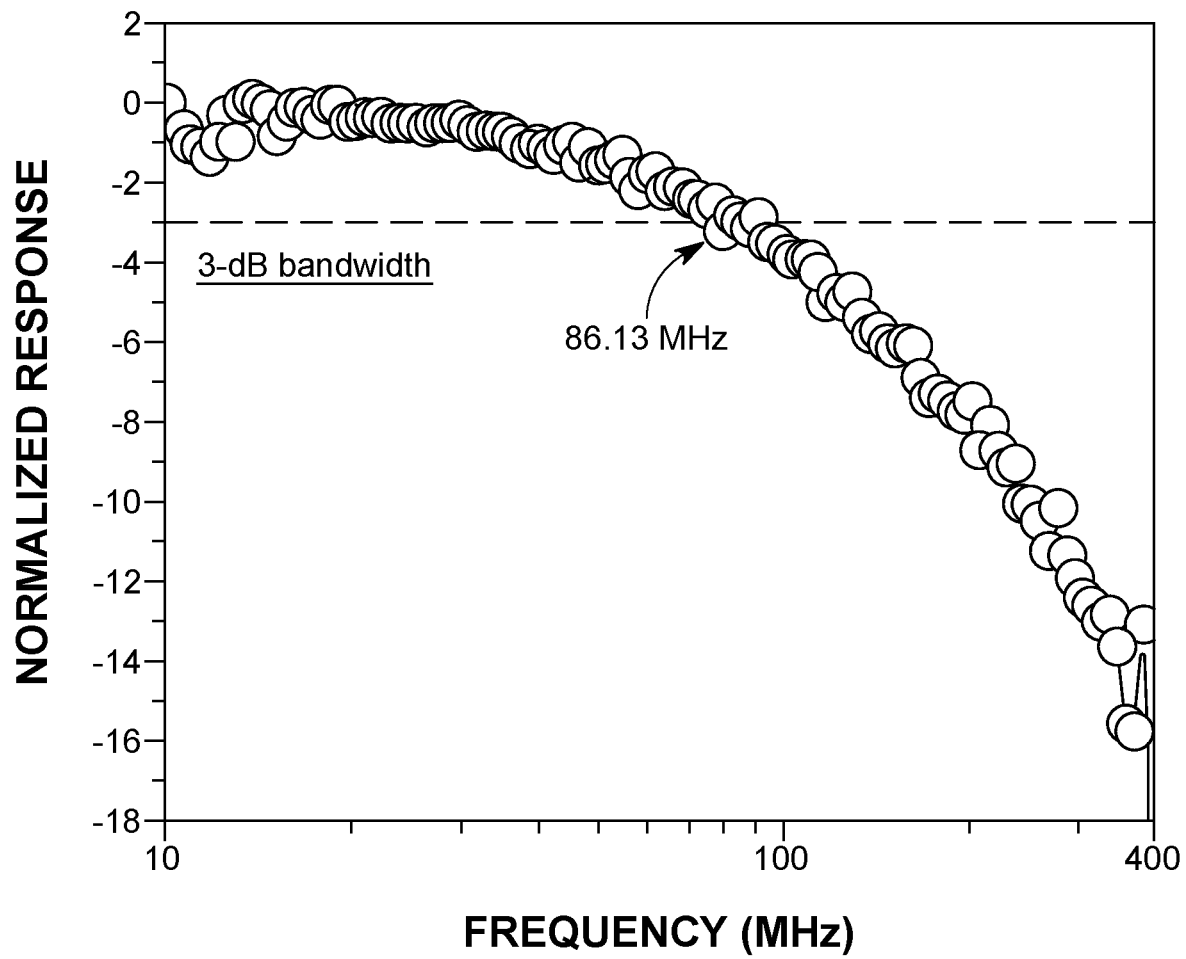
FIG. 7A illustrates the normalized, small-signal frequency response of a large-area scintillating-fiber submerged in water.

The normalized small-signal frequency response of a tested large-area scintillating-fiber-based submerged photoreceiver is shown in FIG. 7A. It is noted that despite the large detection area of the scintillating-fiber-based photoreceiver, it exhibits a relatively large 3-dB bandwidth of up to 86.13 MHz, which can be attributed to the fast photoluminescence (PL) decay lifetime of the polystyrene-hosted organic or inorganic dye molecules in the core layer. Assuming a bi-molecular recombination mechanism, based on the measured 3-dB modulation bandwidth, the PL decay time (i) of the dye molecules was estimated to be in the range of 1.85 ns. As compared to other diode-based photoreceiver designs for communication applications, the trade-off between detection area and bandwidth remains a critical bottleneck due to the limit of RC delay in the device. This eventually impedes the subsequent deployment of various communication links, in particular for UWOC applications, where maintaining a point-to-point alignment is crucial. Differently from the design of conventional photodiodes, the scintillating-fiber-based node 500 does not suffer from the issue of RC-limits, but merely depends on the PL decay time and pulse spreading in the fiber core. The 3-dB bandwidth and the large photodetection area surpasses many of the already reported UV-based photodiode designs conceived for optical communication links.

Figure 7B:
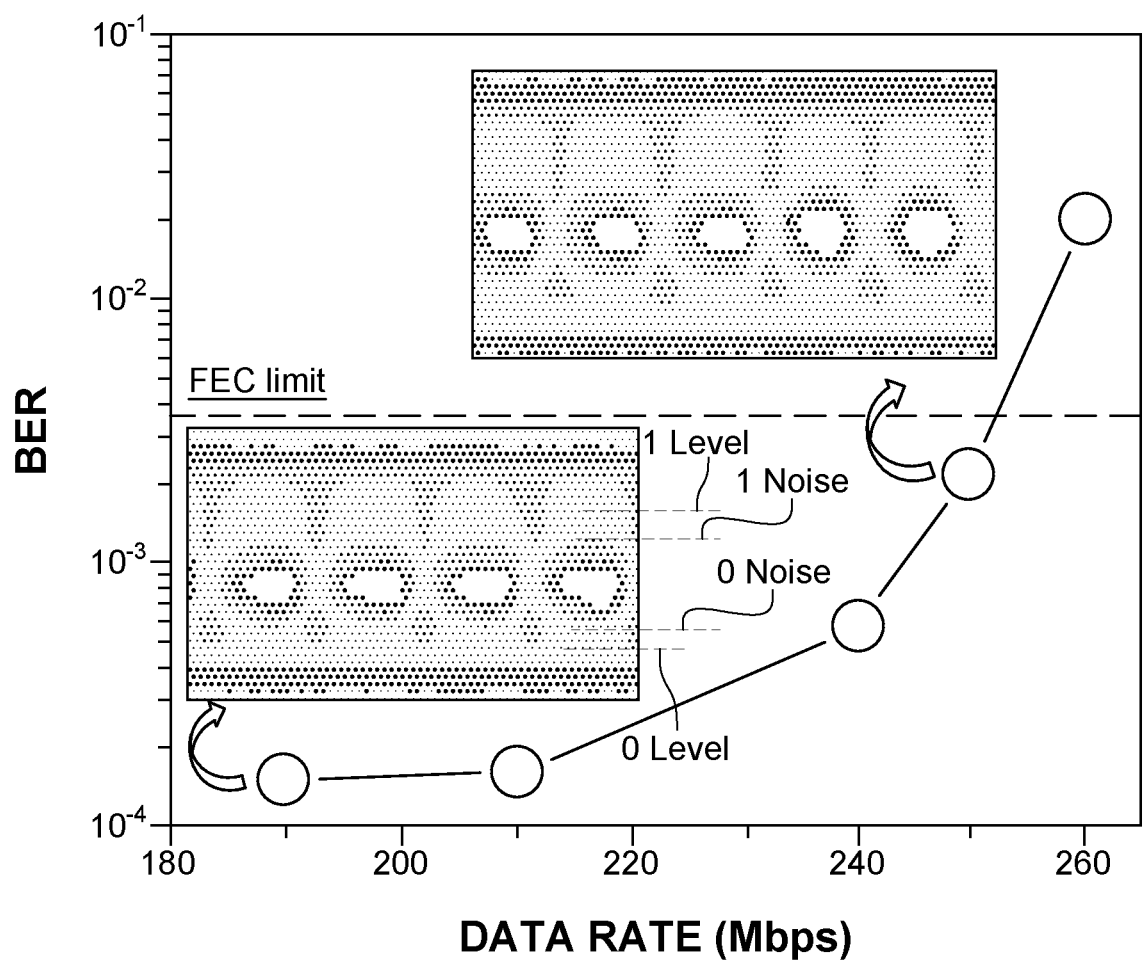
FIG. 7B show the bit-error-ratio versus data rate of a 1.15-meter long underwater communication channel using scintillating fibers as the photoreceiver.

Taking advantage of the large 3-dB modulation bandwidth demonstrated by the scintillating-fiber-based photoreceiver, the inventors have measured the data rate of the underwater communication link over the 1.15-meter long water channel using a non-return-to-zero on-off keying, NRZ-OOK, modulation with a pseudorandom binary sequence (PRBS) $2^{10}-1$ data stream. Eye diagrams were simultaneously captured. FIG. 7B shows the bit-error-ratio (BER) versus data rate of the 1.15-meter long underwater communication channel using the arrayed scintillating fibers as the photoreceiver. The received optical power before the avalanche photodetectors (APD) was measured to be about 1.2 µW. A maximum data rate of 250 Mbps was recorded with a BER at $2.2 \times 10^{-3}$, which falls below the limit of forward-error-correction (FEC) of $3.8 \times 10^{-3}$. The insets of FIG. 7B show the clear eye diagrams of the corresponding data rates at 190 Mbps and 250 Mbps, respectively. The achieved data rate is adequate to support various underwater activities requiring high-bit rate connectivity, e.g., high-definition video streaming for oceanographic surveys, diver-to-diver communication, as well as between various underwater tactical vehicles, e.g., autonomous underwater vehicle (AUV) and submarine, without strict requirement on pointing, acquisition, and tracking (PAT). This proves that the nodes 150 and/or 500 are capable of omnidirectional communication and energy harvesting when used with UV incoming signals.

Figure 8:
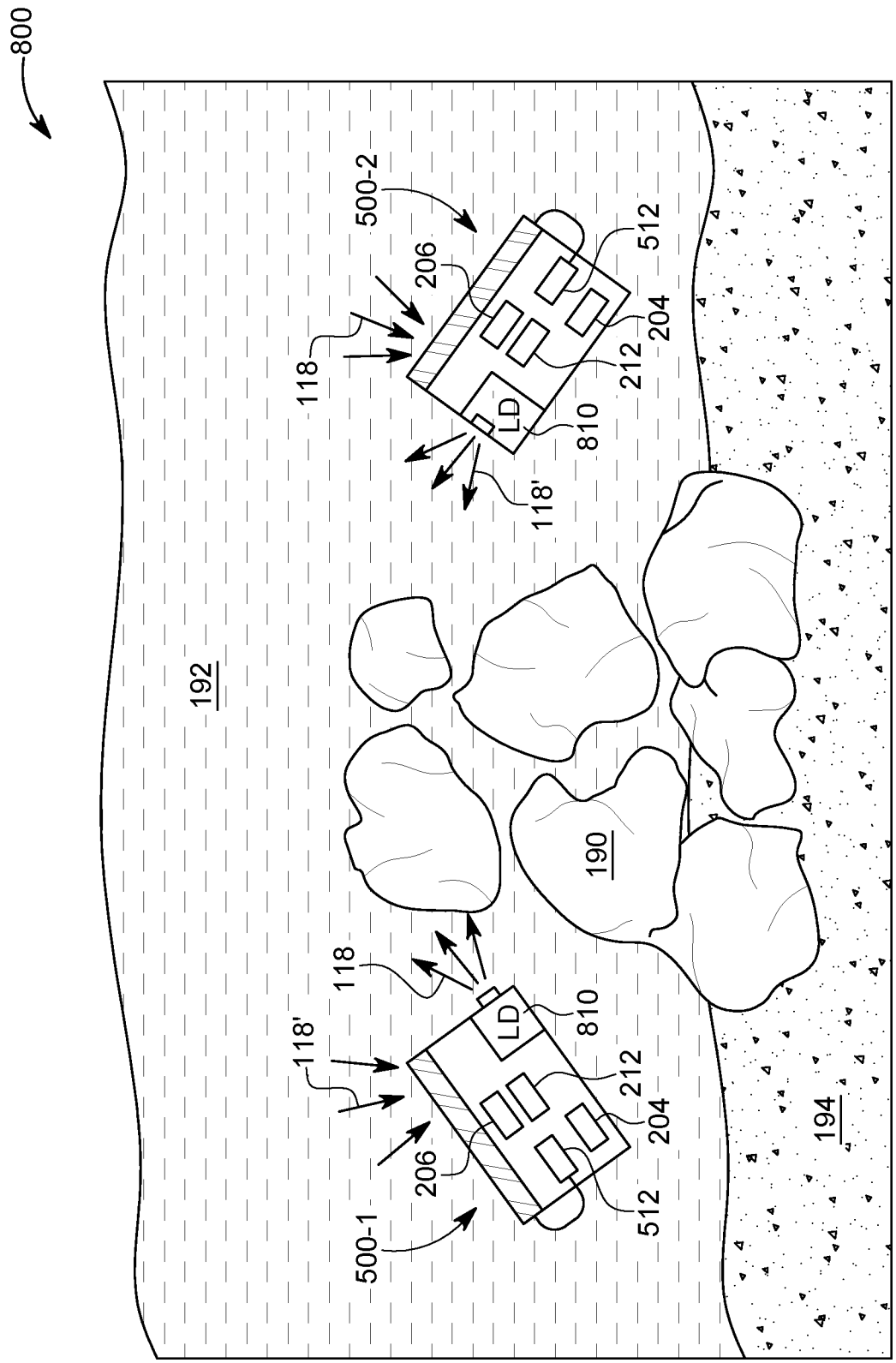
FIG. 8 illustrates a system including two free, autonomous nodes that exchange information underwater in a wireless manner using UV light.

The nodes 150/500 may further be configured to achieve full-duplex underwater wireless optical communication under turbulence (FD-UWOC) [5]. Such a system 800 is illustrated in FIG. 8 and includes two free nodes 500-1 and 500-2. More than two nodes may be used. Each free node has the structure discussed above with regard to FIG. 5 (or the structure shown in FIGS. 2 and 3), but for simplicity, some of the internal components of the free nodes are omitted. In addition, each free node includes a laser diode (LD) 810 that is capable of emitting the first optical signal 118, (or third optical signal 118'), in the UV range. The control circuit 204 (e.g., processor and memory) is connected to each component of the node, so that the control circuit 204 controls the generation of the first optical signal, the encoding of this signal, and also the decoding of the received optical signals. The control circuit 204 is also configured to receive the measurements from the sensors 160 and encode them into the first optical signal when generated and emitted by the LD 810. While FIG. 8 shows the full duplex communication between two free nodes, the same can be obtained between one free node and the cable-connected node 110. FIG. 8 shows the two nodes 510-1 and 510-2 fully immersed in water 192 and an obstacle 190 (rocks) being present on the ocean bottom 194, between the nodes, so that no line-of-sight direct communication is possible.

Figure 9A:
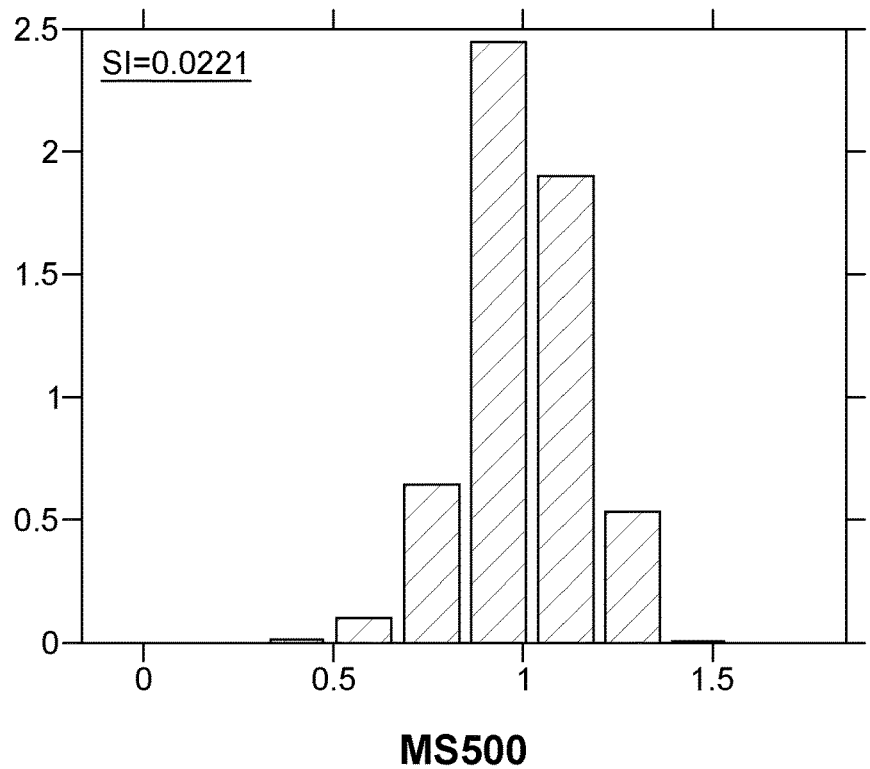
FIGS. 9A to 9C illustrate the averaged scintillation index of two channels between two free nodes that move under different speeds in water.
Figure 9B:
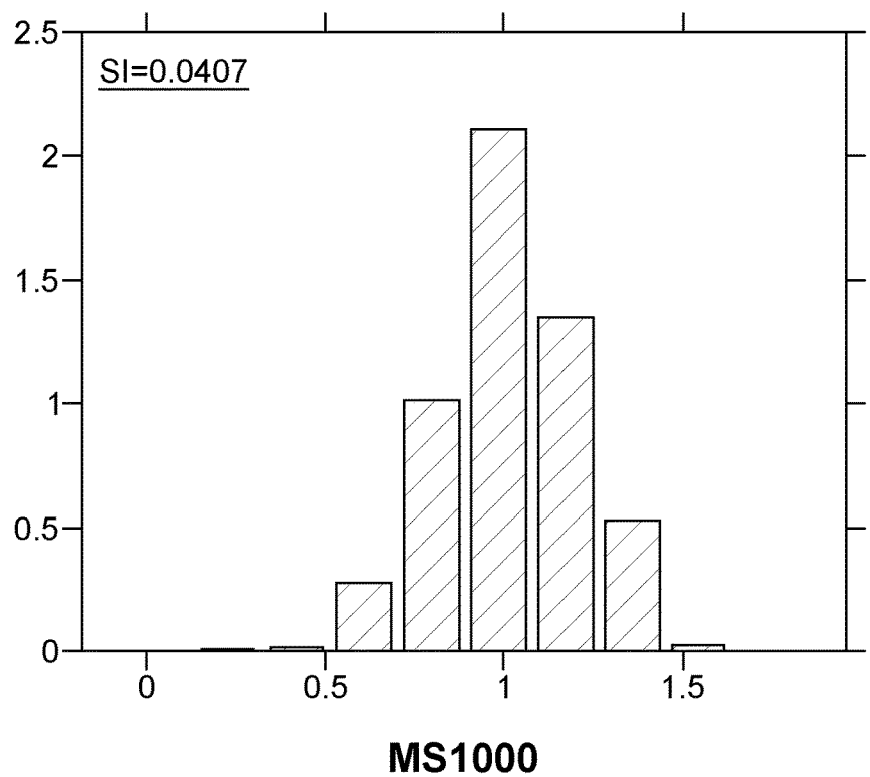
Figure 9C:
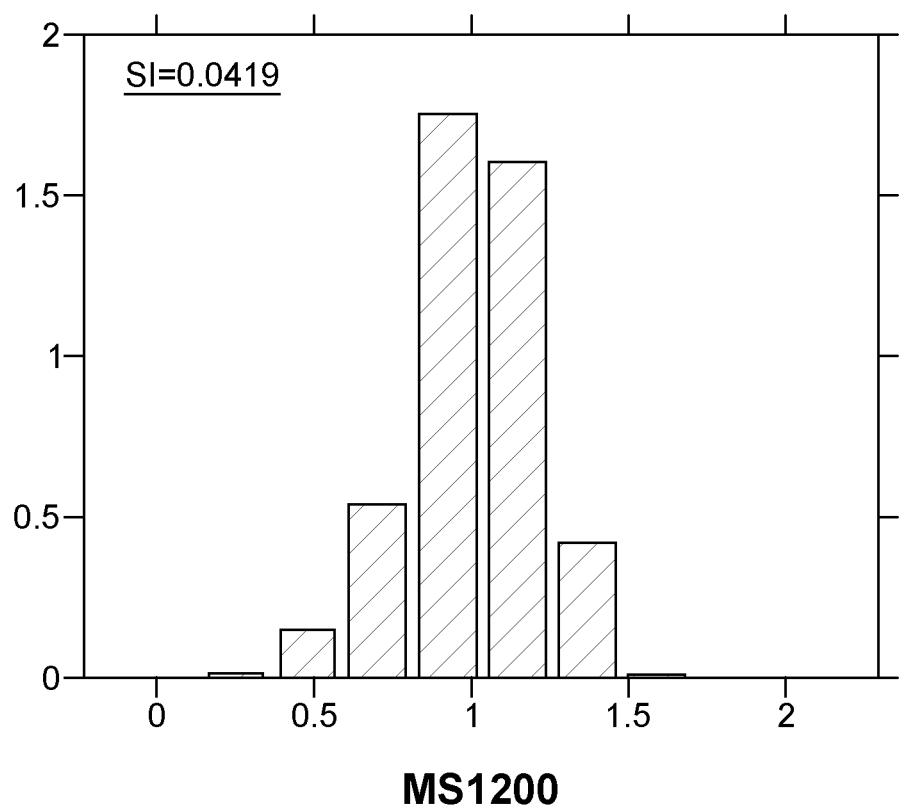

The fiber-based FD-UWOC system 800 was tested in a mobile case to emulate the scene carried by ROV and communicate with an underwater sensor node while the ROV moves. The laser 810 was mounted on a mobile platform, and a motor speed of the platform controlled the moving speed of the laser. The motor speed was set to 500, 1000, or 1200 r/min (denoted MS500, MS1000, and MS1200, respectively), and the corresponding moving speed of the laser was 0.86, 1.72, or 2.06 m/s, respectively. Although the laser beam was hitting on different parts of the fibers 510 without a miss when it was moving horizontally, the averaged scintillation index (SI) of two channels under different speeds was very high compared to that in the stationary case, as illustrated in FIGS. 9A to 9C. In the mobile case, the FD fiber-based UWOC system 800 could still maintain a low outage probability due to the better light coupling from the fiber to the APD. The power fluctuation of the received signal is minimized. The low outage probability of the novel system 800 with different moving speeds (from 4% to 14%) proves the system's robustness when compared to the benchmark system, which cannot work under mobile scenarios with 100% outage probability. The results of this test are shown in the table in FIG. 10.

The scintillating-fiber/450-nm-laser-based FD-UWOC system 800 was characterized in terms of frequency response at 67.61 and 67.58 MHz for two transceivers, and the maximum achievable data rate was 250 and 125 Mbit/s with OOK and PPM schemes, respectively, and self-interference at a level of −40 dB. The effects of turbulence on the UWOC system were also investigated. Outage probability was employed to evaluate the system performance under air-bubble-, temperature-, salinity-, and mobility-induced turbulence. A benchmark system without applying a scintillating fiber detector was tested under the same turbulence for comparison. In comparing the outage performance of the benchmark system and the proposed scintillating-fiber-based FD-UWOC system 800, laboratory experiments proved the robustness of the scintillating fiber detector for omnidirectional signal detection over a complex underwater channel. Field tests on the FD-UWOC system 800 in an outdoor diving pool further validated the stability of the system when operating in a real scenario.

Based on the embodiments discussed above, a low maintenance anti-fouling and self-powered system for underwater mobile and fixed network nodes having integrated transmitter module, hybrid solar cells receiver module and omnidirectional light harvesting fiber module including a colour-converting layer may be implemented. The transmitter module may include a light source, which is a compact diode-based component for transmitting data and light energy. The hybrid solar cells modules can directly detect light for optical communication, and/or can directly absorbs light from the ambient or a transmitter. In one application, the control circuits are configured to instruct the optical coupler to automatically select the solar cells to perform energy harvesting under weak or strong ambient light.

In this or another application, the light harvesting fibers convert the first optical signal of 300-450 nm ultraviolet to blue light into the second optical signal having a wavelength of 450-900 nm, before guiding the second optical signal to the hybrid solar cell, with the second wavelength light matching higher external quantum efficiency wavelength range of the silicon solar cell. As previously discussed, the housing of the free nodes may be coated or encapsulated in an antifouling layer for extended use underwater. The anti-biofouling layer or coating is selected to be transparent to the first optical signal for ensuring high capture, collection, and conversion of optical-to-electrical power. An anti-reflection layer that is transparent to the first signal and reflects the second signal may also be provided over the housing.

The wavelength-conversion layer of the node 150 may convert the incoming first optical signal having a shorter wavelength into the second optical signal having a longer wavelength region. A single or an array of solar cells may be provided inside or outside the housing to convert the second optical signal into usable electrical power. Thus, the nodes are self-powered and operate in the presence of ambient light at underwater or when illuminated by an incoming underwater vehicle. The nodes may have an integrated electronic control and data logging for monitoring (1) the ambient light intensity for switching between amorphous/crystalline solar cell harvesting energy and guided light from the light-harvesting fiber module, (2) degree of biofouling over time, (3) power management, and (4) battery life.

The wavelength-conversion layer can include any quantum dots that can absorbs any wavelength in the UV to visible range and re-emits in a longer wavelength region of visible to near-infrared range. The anti-reflection layer can include a distributed Bragg reflector having more than 5 stacks of alternating dielectric materials. The anti-biofouling layer may have a transparency of 60% to 100% in the UV range.

In yet another embodiment, there is a low maintenance system for underwater mobile and fixed network nodes having integrated hybrid solar cells module and light-harvesting fibers. A free node of the system may include an anti-biofouling layer or coating that is transparent to the first optical signal for ensuring high capture, collection, and conversion of optical-to-electrical power. The free node may also include an array of wavelength-converting scintillating fibers that absorbs the first optical signal and emits a second optical signal. The free node further includes an optical coupler that steers the second optical signal to solar cells for energy harvesting or to a photodetector module for data decoding. The solar cells may be a single or an array of solar cells that convert the second optical signal into usable electrical power. The photodetector module is configured to convert the second optical signal carrying modulated data into an electrical signal that is later decoded to extract information. The free node may also include a control module that has integrated electronic control and data logging to monitor light intensity for switching between amorphous/crystalline solar cell and guided light from the light-harvesting fiber module, degree of biofouling over time, power management, and battery life.

The wavelength-converting scintillating fibers have a core layer that can include any quantum dots that can absorb any wavelength in the UV to visible range and re-emits in a longer wavelength region of visible to near-infrared range. The fibers also have a cladding layer that has a transparency of at least 60% in the UV range. In one application, the quantum dots have a radiative recombination lifetime of less than 1 milliseconds. The anti-biofouling layer has a transparency of 60% to 100% in the UV range. The solar cells can include amorphous, single-crystalline, or polycrystalline silicon-based solar cells depending on the matching of absorption spectrum with the wavelength-converting quantum dots.

Figure 11:
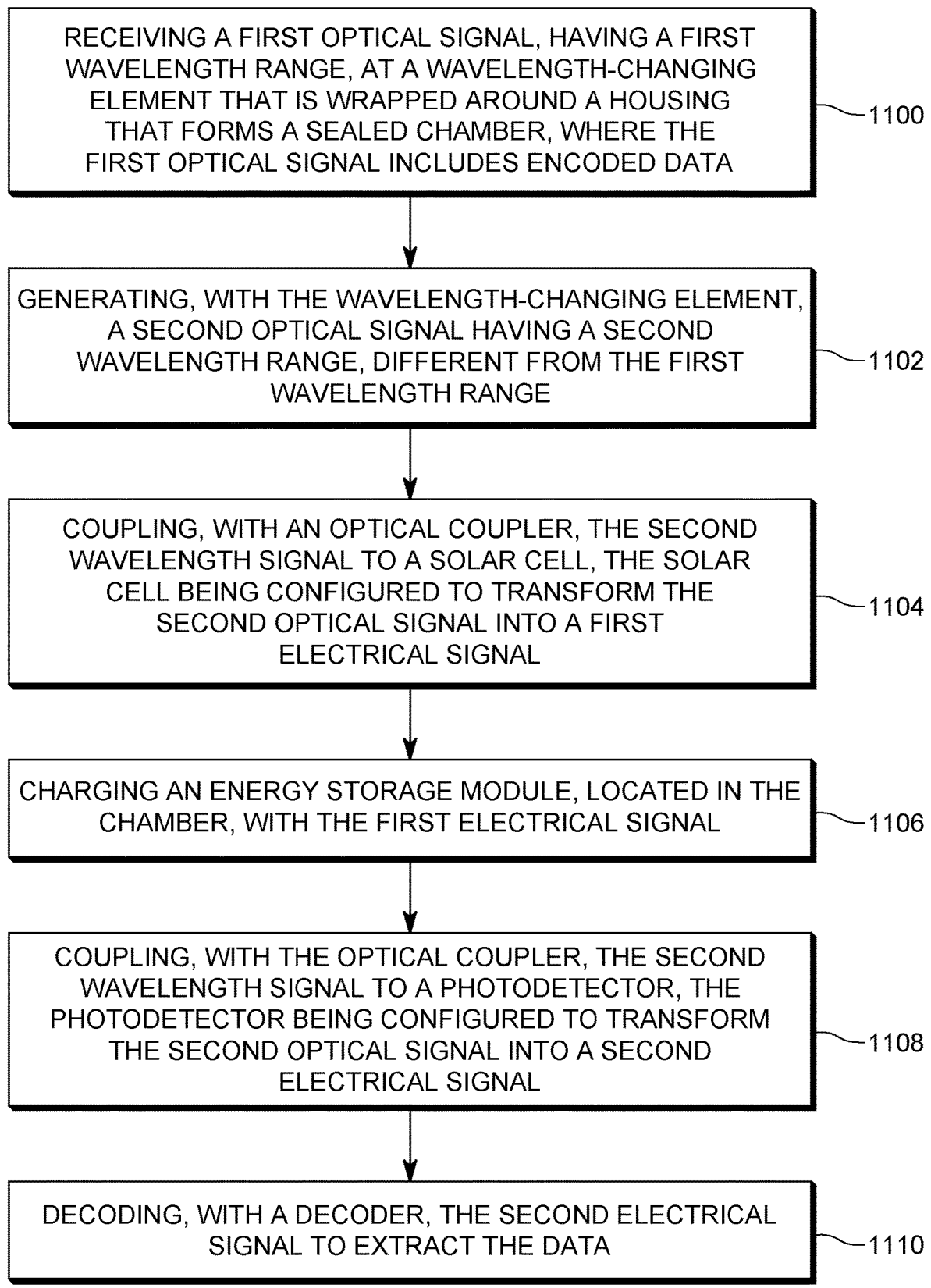
FIG. 11 is a flow chart of a method for achieving optical communication underwater with two free, autonomous nodes.

A method for wireless underwater communication performed with the system illustrated in FIG. 8 is now discussed with regard to FIG. 11. The method includes a step 1100 of receiving a first optical signal, having a first wavelength range, at a wavelength-changing element that is wrapped around a housing that forms a sealed chamber, where the first optical signal includes encoded data, a step 1102 of generating, with the wavelength-changing element, a second optical signal having a second wavelength range, different from the first wavelength range, a step 1104 of coupling, with an optical coupler, the second wavelength signal to a solar cell, the solar cell being configured to transform the second optical signal into a first electrical signal, a step 1106 of charging an energy storage module, located in the chamber, with the first electrical signal, a step 1108 of coupling, with the optical coupler, the second wavelength signal to a photodetector, the photodetector being configured to transform the second optical signal into a second electrical signal, and a step 1110 of decoding, with a decoder, the second electrical signal to extract the data. The first wavelength range is ultraviolet light and the second wavelength range is visible or infrared light. In one application, the wavelength-changing element is a wavelength-converting scintillating fiber. The method may further include a step of generating a third optical signal with a laser diode, and a step of emitting the third optical signal from one free node to another node. Because the wavelength-changing element is made to include a material that absorbs the first optical signal and emits the second optical signal, there is no need to align the emitter of the signal with the receive of the signal, i.e., the wavelength-changing element is omnidirectional. As discussed above, the wavelength-changing element may be the layer 154 or the fibers 510.

The disclosed embodiments provide a free node that uses an incoming optical signal to harvest energy and also decode data. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.
[1] Kang et al., Optics Express 27(21), 30450-30461 (2019).
[2] U.S. Pat. No. 9,749,044B1.
[3] International Patent Application PCT/IB2021/054004.
[4] PCT Patent Application No. WO2020170166A1.
[5] Guo et al., Optics Express 30(1), 53-69 (2022)

What is claimed is:

1. A free node to be deployed underwater for omnidirectional energy and data harvesting, the free node comprising:
a housing that forms a sealed chamber;
a wavelength-changing layer attached to an outside of the housing and configured to receive a first optical signal having a first wavelength range and to emit a second optical signal having a second wavelength range, different from the first wavelength range, wherein the first optical signal includes encoded data;
a flexible solar cell wrapped around the housing, the flexible solar cell being configured to receive the second optical signal and generate an electrical signal;
an energy storage module located in the chamber and configured to store electrical energy associated with the electrical signal; and
a decoder located in the chamber and configured to receive the electrical signal and decode the encoded data,
wherein the first wavelength range is ultraviolet light and the second wavelength range is visible or infrared light.

2. The free node of claim 1, wherein the flexible solar cell is fully outside the housing.

3. The free node of claim 1, wherein the flexible solar cell is fully inside the housing.

4. The free node of claim 1, wherein the wavelength-changing layer fully encloses the housing.

5. The free node of claim 1, wherein the wavelength-changing layer partially encloses the housing so that a portion of the housing directly receives a part of the first optical signal, and the portion of the housing is transparent to the first optical signal.

6. The free node of claim 5, further comprising:
a photodetector located in the chamber, wherein the part of the first optical signal that enters through a wall of the housing is directly received by the photodetector.

7. The free node of claim 1, further comprising:
an anti-reflection layer formed on the wavelength-changing layer for reflecting light back to the housing.

8. The free node of claim 7, further comprising:
an anti-fouling layer formed on the anti-reflection layer.

9. The free node of claim 1, wherein there is no cable or wire exiting the housing and being attached to an object that is not part of the housing.

10. The free node of claim 1, further comprising:
a sensor configured to collect ambient data; and
a laser diode located in the chamber and configured to generate a third optical signal in the UV range, the third optical signal including the ambient data.

11. A free node to be deployed underwater for omnidirectional energy and data harvesting, the free node comprising:
a housing that forms a sealed chamber;
one or more wavelength-converting scintillating fibers attached to an outside the housing and configured to receive a first optical signal having a first wavelength range and to emit a second optical signal having a second wavelength range, different from the first wavelength range, wherein the first optical signal includes encoded data;
an energy storage module located in the chamber;
a flexible solar cell located within the chamber, the flexible solar cell being configured to receive the second optical signal and generate a first electrical signal for charging the energy storage module;
a photodetector located within the chamber and configured to transform the second optical signal into a second electrical signal; and
an optical coupler configured to supply the second optical signal either to the flexible solar cell or to the photodetector,
wherein the first wavelength range is ultraviolet light and the second wavelength range is visible or infrared light.

12. The free node of claim 11, further comprising:
a decoder located in the chamber and configured to receive the second electrical signal and decode the encoded data.

13. The free node of claim 11, wherein the one or more wavelength-converting scintillating fibers includes dye molecules that absorb the first optical signal and emit the second optical signal, and the second optical signal is guided through within the one or more wavelength-converting scintillating fibers.

14. The free node of claim 11, wherein one or more wavelength-converting scintillating fibers fully encloses the housing.

15. The free node of claim 11, wherein the one or more wavelength-converting scintillating fibers float around the housing.

16. The free node of claim 11, further comprising:
an anti-fouling layer formed on the one or more wavelength-converting scintillating fibers.

17. The free node of claim 11, wherein there is no cable or wire exiting the housing.

18. The free node of claim 11, further comprising:
a sensor configured to collect ambient data; and
a laser diode located in the chamber and configured to generate a third optical signal in the UV range, the third optical signal including the ambient data.

19. A method for optical wireless underwater communication, the method comprising:
receiving a first optical signal, having a first wavelength range, at a wavelength-changing element that is wrapped around a housing that forms a sealed chamber, wherein the first optical signal includes encoded data;
generating, with the wavelength-changing element, a second optical signal having a second wavelength range, different from the first wavelength range;
coupling, with an optical coupler, the second wavelength signal to a flexible solar cell, the flexible solar cell being configured to transform the second optical signal into a first electrical signal;
charging an energy storage module, located in the chamber, with the first electrical signal;
coupling, with the optical coupler, the second wavelength signal to a photodetector, the photodetector being configured to transform the second optical signal into a second electrical signal; and
decoding, with a decoder, the second electrical signal to extract the data,
wherein the first wavelength range is ultraviolet light and the second wavelength range is visible or infrared light.

20. The method of claim 19, further comprising:
generating a third optical signal with a laser diode; and
emitting the third optical signal from one free node to another node.

* * * * *